Oct. 20, 1931.  M. J. CASEY  1,827,869
APPARATUS FOR PEELING FRUIT
Filed Dec. 22, 1927  3 Sheets-Sheet 1
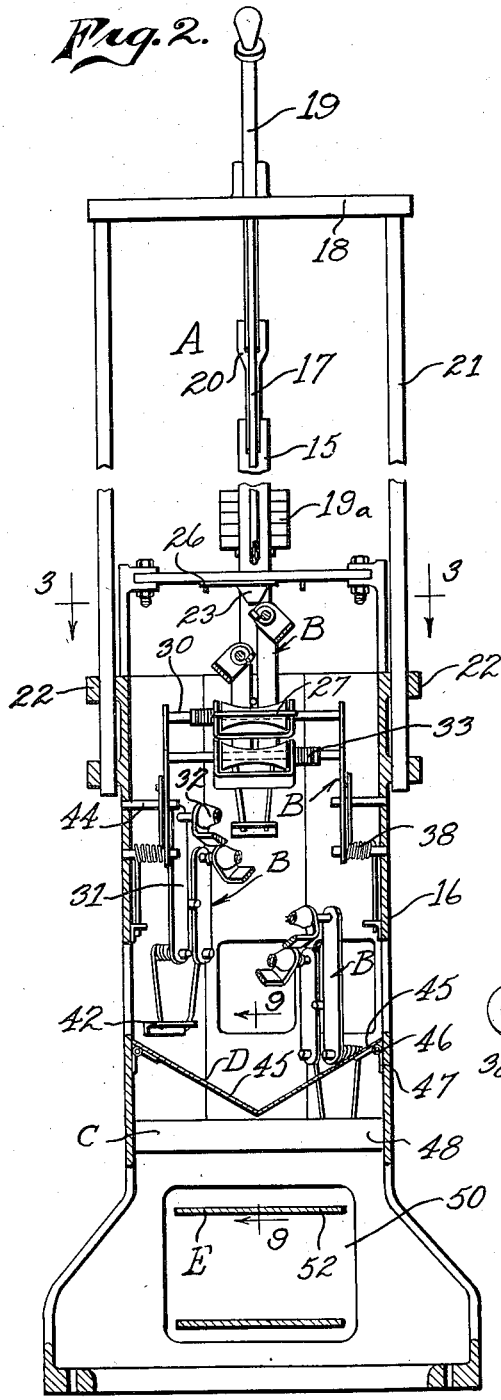
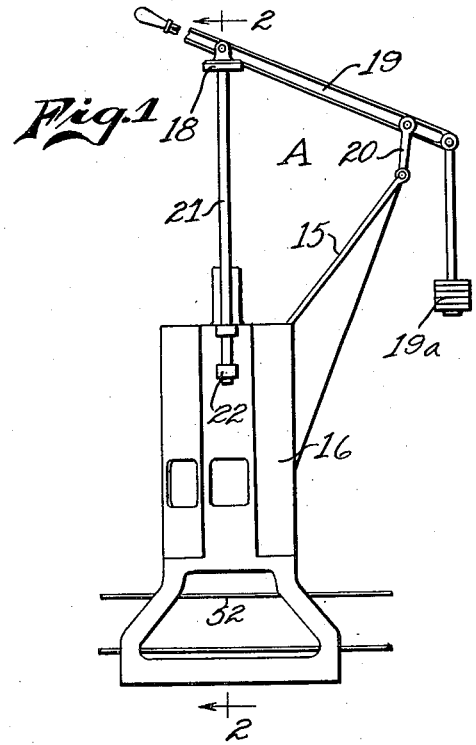
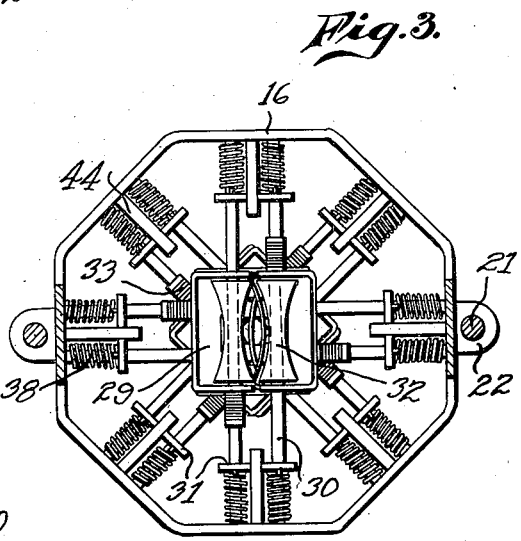
INVENTOR.
Mary J. Casey

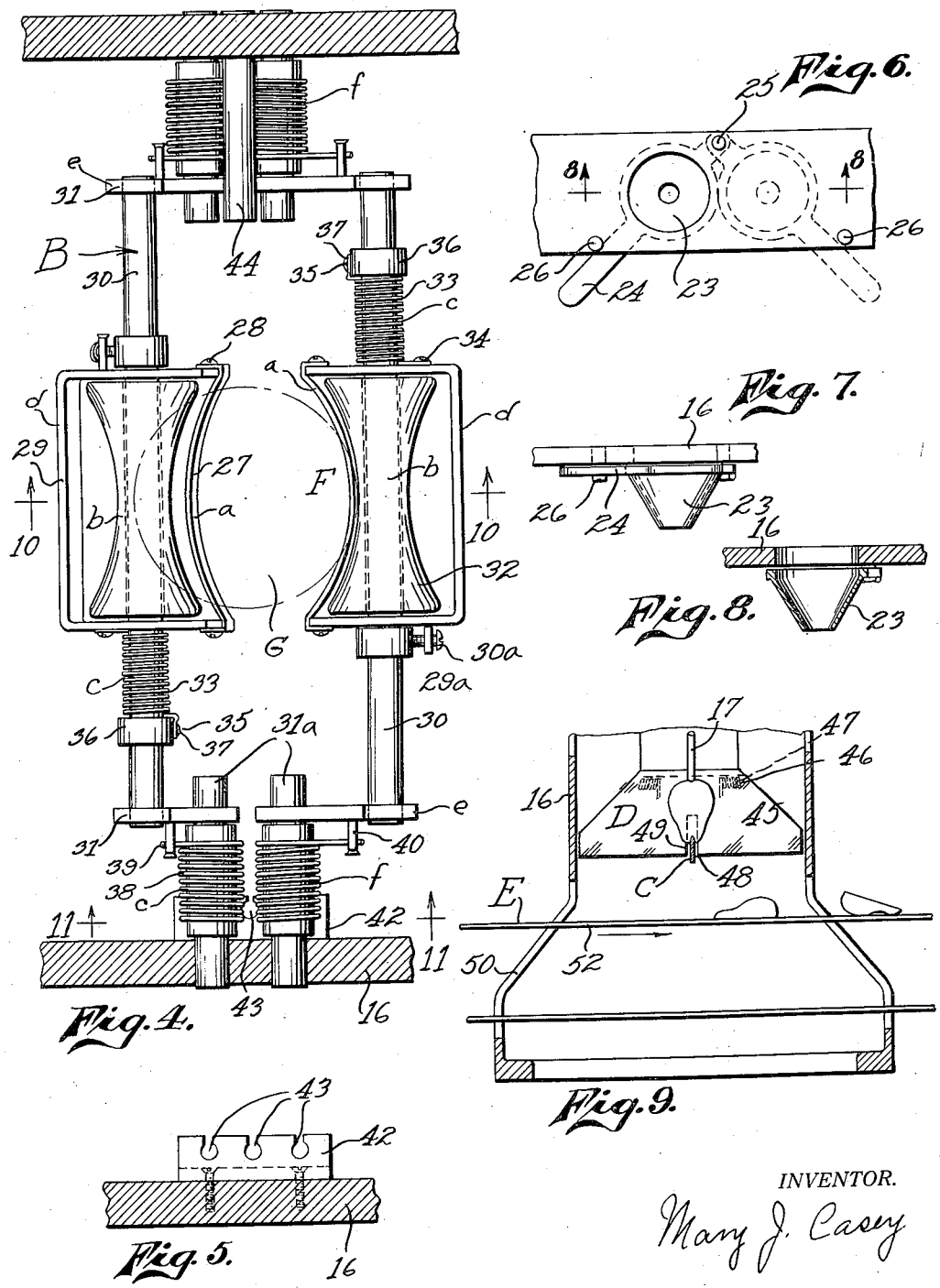

Oct. 20, 1931.    M. J. CASEY    1,827,869
APPARATUS FOR PEELING FRUIT
Filed Dec. 22, 1927    3 Sheets-Sheet 3
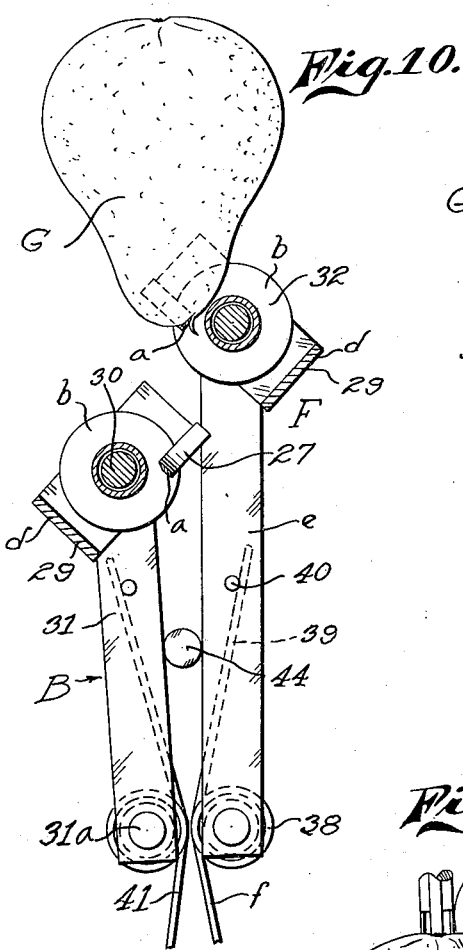
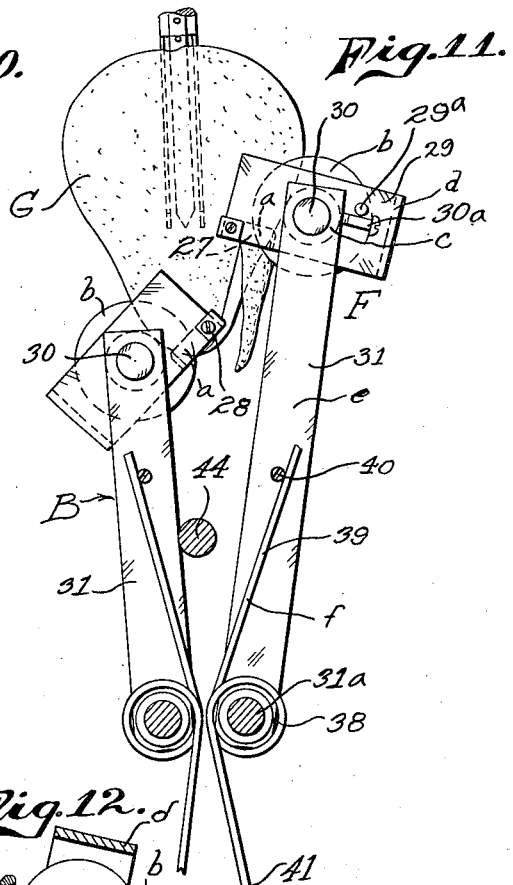
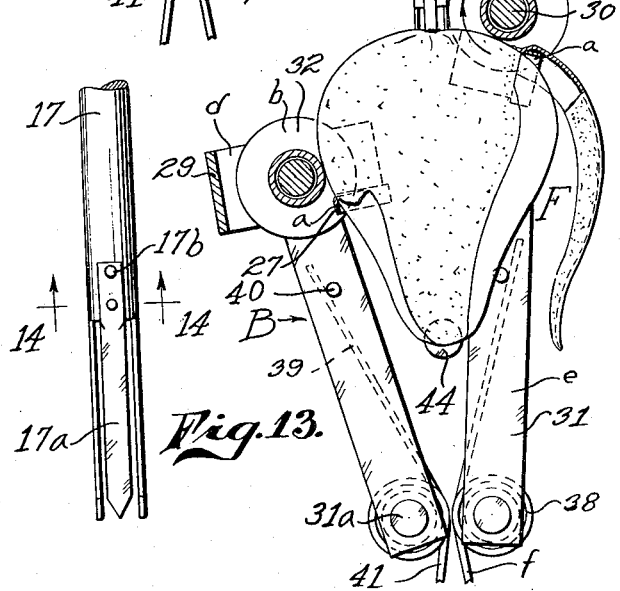
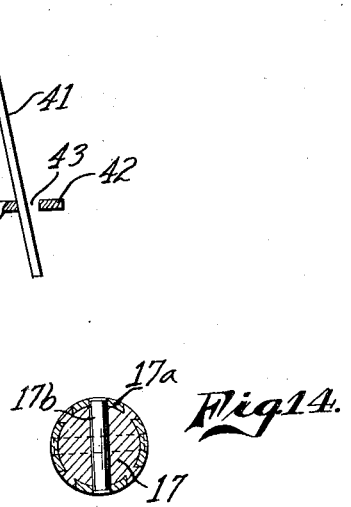
INVENTOR.
Mary J. Casey Patented Oct. 20, 1931

1,827,869

UNITED STATES PATENT OFFICE

MARY J. CASEY, OF SAN JOSE, CALIFORNIA, ASSIGNOR TO SPRAGUE-SELLS CORPORATION, OF HOOPESTON, ILLINOIS, A CORPORATION OF DELAWARE

APPARATUS FOR PEELING FRUIT

Application filed December 22, 1927. Serial No. 241,880.

This invention relates to fruit peeling machines and is particularly applicable to the peeling of fruit of more or less regular contour from which it is desired to remove a peel of minimum thickness. In the past it has been necessary to peel such fruits by hand, particularly pears, in order to insure removal of the peel with minimum waste and without injury to the fruit. The canning trade demands this type of fruit with the cutting marks in certain definite directions; for instance, the cuts on pears are required to be parallel to the axis of the fruit. Other fruits must be peeled around the axis.

Such hand peeling is laborious, expensive and wasteful since, in as much as it is done at high speed by the workers, considerable more of the peel is removed than is necessary to give the appearance desired, and usually the peel is taken off with flat knifes, leaving a more or less irregular surface,— a curved knife being more difficult and dangerous for a person to handle than the ordinary flat knife.

In machine operation, however a curved knife is much preferable to the ordinary flat knife usually used, since it conforms more nearly to the rounded shape of the fruit and cuts a more uniform thickness of peel, and wastes much less of the fruit.

It will also be noted that the peeling operation is accomplished by successive stages, thus simulating hand peeling but doing it in a much more uniform and efficient manner. The depth of cut of each knife being controlled automatically the finished fruit has a very neat and finished appearance, and by cutting successively in the manner disclosed there is much less strain and tension on the ripe pulp of the individual fruits with the result that the fruit is much less mutilated during the cutting operation than is possible under other conditions.

The locating of the fruit relative to the cutting mechanism is most important. Its location must be regulated to a fine degree so that it is centrally mounted on the handling mechanism and is axially positioned relative to its path of travel through the machine. In order to provide this desirable condition of operation I have devised centering and positioning means whereby each fruit is individually aligned with the operating spindle and is immovably held in this position until the spindle has engaged the fruit.

I have devised means for holding the fruit by one end so that the other end is exposed to the peeling knives and is consequently almost completely peeled at this end. I have also devised peeling mechanism that will approach much closer to the supported end of the fruit than is usually the case so that this end is peeled more nearly complete than heretofore.

In the peeling of pears, for example, it is as has been mentioned, desirable to have the cut running axial with the fruit. The centering device mentioned will so hold the fruit that the operating spindle will engage it by the large end and since it is moved axially through the machine the cut will necessarily run axially of the fruit.

So that the peeling knives will follow the most minute irregularities on the surfaces of the fruits they are pivoted on the ends of controlling arms and tend to move circumferentially around this pivot during the cutting operation and are held in proper cutting position by means of yielding devices having sufficient tension to hold them to their work, and are controlled to depth of cut by associated devices that are in constant contact with the fruit ahead of the knives.

It is an object of the invention to provide a device for automatically passing controlled fruits to a series of peeling stations whereby the peeling of each fruit is accomplished in successive stages with sufficient stations to completely remove the peeling from each fruit.

It is also an object of the invention to provide a device for peeling fruits or like articles in successive stages to thereby relieve the surface tension on very ripe fruits and permit of peeling such fruit with a minimum of spoilage or mutilation.

It is also an object of the invention to provide a device for peeling fruits or like articles wherein means are provided for automatically centering and aligning each individual fruit to the operating spindle and immovably holding the same until in control of the spindle.

It is also an object of the invention to provide a cutting implement that is held in cutting position by means of a yielding tension, and which during the cutting operation is urged by said tension to rotate about a pivotal center but is held from such rotation by the resistance of the cut.

With such objects in view as well as other advantages inherent in the invention, I wish it understood that the several necessary elements and combinations constituting the same may be varied in their proportion, placement and general arrangement without departing from the scope and nature of my invention; that the described devices are simply embodiments of the invention which other structures might also employ and some of the parts or combinations of parts may be used without the others in different types of such apparatus without departure from the purview of my invention and I regard myself as entitled to such variations from the shown and described devices as fall within the scope and meaning of the claims hereto appended.

While the drawings show this machine as adapted to the peeling of pears, the principle involved and the elements used to carry out this principle are applicable to the peeling of other fruits and to other arrangements for peeling in different directions, all within the scope of this invention.

Other objects will be apparent from the description of the machine and operation and as finally pointed out in the claims.

Reference will be made to the accompanying drawings, which illustrate but one form of my invention, in which Figure 1 is a side elevation of a device embodying my invention; Fig. 2 is a vertical section on line 2—2 of Fig. 1; Fig. 3 is a transverse section on line 3—3 of Fig. 2; Fig. 4 is a fragmentary enlarged transverse section giving a top view of a pair of peeling elements; Fig. 5 is a detail of the spring adjusting plate; Fig. 6 is a detached top view of the loading device; Fig. 7 is an elevation of the same; Fig. 8 is a section on line 8—8 of Fig. 6; Fig. 9 is a vertical section on line 9—9 of Fig. 2; Fig. 10 is a vertical section on line 10—10 of Fig. 4; showing a detached view of a pair of peeling elements in the first stage of operation; Figs. 11 and 12 are detached elevation and section, respectively, of further steps in the peeling operation; Fig. 13 is a fragmentary end detail of a holding means employed; Fig. 14 is a section on line 14—14 of Fig. 13.

In the form of my invention shown in the drawings, A designates means for holding and carrying the fruit, B represents means for peeling the fruit, C means for cutting the fruit, D means for stripping the fruit from the holding and carrying means A, and E means for carrying the fruit and peels from the machine.

Upon the bracket 15, attached to a frame 16, is mounted the holding and carrying means A. The means A comprises a mandrel 17, long enough to pass vertically through the machine, the upper end being attached to a cross-head 18; a lever 19, which is shown as arranged for hand operation, but which may by slight modification be power operated, is pivoted to and controls the movement of this cross-head, the outer end being pivotally connected to the bracket 15 by a link 20 and counter weighted by weights 19—a. Attached to the cross-head 18 are two guide rods 21, which slide within ears 22, formed on the frame 16, and serve to constrain the travel of this cross head in a vertical direction. The mandrell 17 is provided at its lower end with pointed spring prongs 17—a for engagement with the fruit. These prongs are riveted to the mandrel body as at 17—b and project a short distance longitudinally from the end of the mandrel.

A cup 23 is mounted at the top of the machine for the initial reception of the fruit G. This cup may be mounted upon a lever 24, pivoted to the frame 16 as at 25, so that the fruit lying therein may be swung to the portion of the machine directly under the mandrel 17 for the attachment of fruit to this mandrel, and upon a slight raising of the mandrel swung out of the way so that the fruit may be passed through the machine. The cup is preferably tapering so as to center the fruit and hold same in the correct position and has an opening in the bottom for the passage therethrough of foreign material. A pair of stops 26 are provided for limiting the travel of the lever 24 to assist in locating.

The peeling means B may consist of a cutting element $a$, which may be a cutting or scraping element, a spacing element $b$, means $c$ for maintaining the cutting element in cutting position, means $d$ for carrying such cutting element, means $e$ for carrying such spacing element, and means $f$ for holding such spacing element in contact with the fruit. The means $b$, $c$, $d$, $e$ and $f$ comprising means F for causing the peeling element to follow the contour of the fruit. There may be any number of these peeling elements B arranged for successive presentation of the fruit in its passage through the machine, but they are preferably arranged in opposing pairs. The elements of each pair may be somewhat staggered along the line of travel to prevent interference of the elements when operating close to the axis, the purpose of so arranging them in pairs being to balance as far as possible the side thrusts on the mandrel 17. Four pairs of the peeling means B are shown in the drawings, this having been found sufficient for the operation on pears, although more or less can be used as the fruit may require.

Each of the peeling means B consists of the elements $a$ and $b$ and of the means $c$, $d$, $e$ and $f$, previously noted.

The element $a$ is shown as a knife 27 curved to partially conform to the maximum contour of the fruit G and attached by screws 28 to a yoke 29, such yoke forming the means $d$. This yoke 29 is pivotally mounted on a pin 30, extending between and rigidly affixed to opposed carrier arms 31 and forming with them the means $e$. Also mounted upon this pin 30 and freely turning thereon is mounted the means $b$, comprising a roller 32, which is preferably made of wood or fibre or some other non-corrosive material and which may be curved to conform more closely to the contour of the fruit. The means $c$ is shown as comprising a coil spring 33 mounted on the pin 30 and having one end attached to the yoke 29 as at 34, and having the other end attached as at 35 to a collar 36 affixed to the pin 30 by set screw 37, so that a force is continually exerted upon the yoke 29 so as to hold the cutting elements in position shown in Fig. 10, co-acting stops 29—$a$ and 30—$a$, being affixed to the yoke 29, and pin 30, respectively, for preventing over-travel of the yoke 29. The opposed carrier arms 31 are each pivoted to pins 31—$a$ affixed to the frame 16. A coil spring 38 surrounding the pin 32 has an upward extension 39 adapted to bear against a stop screw 40, attached to the arm 31, and a lower extension 41 adapted to bear against a spring adjustment plate 42, attached to the frame 16. The adjustment plate 42 is provided with a series of notches 43, into any of which the extension 41 may be placed, the notches being so arranged as to give varying pressures through the spring 38 to hold the carrier arms 31 and the elements carried thereby in correct peeling position, the spring 38 constituting the means $f$. A stop pin 44 is provided for preventing over-travel of the carrier arms 31 past the position shown in Fig. 10, thus maintaining the carrier arms at rest in position for the reception of the fruit.

Below the last of the peeling elements B, a pair of opposed shutters 45 are so arranged as to close the bottom of the machine. These shutters are hinged on opposite sides of the machine as at 46 and held in closed position by coil springs 47. These shutters are angularly disposed, sloping downward toward the line of fruit travel so that pressure from above will open them against the action of the springs 47.

Immediately below the shutters 45 is placed a stationary knife 48 with the cutting edge pointing upward and in direct line of fruit travel. This knife is shown as having a single cutting edge for the halving of the fruit, but may be arranged to quarter, core or otherwise cut the fruit. The shutters 45 have an opening therein as at 49 to permit them to pass beyond the knife edge.

Below the knife, the frame 16 is cut away as at 50 for the reception of a run of conveyor belt 52, for the carrying of peeled fruit and peelings from the machine. With the straight knife shown, the fruit would be touched up and cored by hand as it is taken from the conveyor belt.

The operation is as follows: Fruit G is placed in the cup 23, the lever 19 is operated to force the prongs 17—$a$ into the center portion or core of the fruit, as best shown in Fig. 11; then the lever is raised slightly, raising the mandrel and the fruit attached thereto, and the cup swung aside. The lever is then pushed downwardly, forcing the fruit through the machine to the limit of travel allowed, passing thus between all the peeling elements B, through the shutters 45 and across the knife 48. The prongs 17—$a$ are not necessarily forced for their full length into the fruit, but sufficient space is left at the top so that the knife 48 may pass completely through the fruit and between the prongs 17—$a$. Upon passage of the fruit below the shutters 45, the shutters spring closed against the mandrel 17, and upon raising the lever 19, the mandrel 17 is withdrawn ready for the next fruit, the peeled and cut fruit being stripped therefrom by the shutters 45.

It will be noticed in Figures 10, 11 and 12 that the fruit G first contacts with the spacing element $b$, coming against the cutting element $a$ and rolling over the spacing element $b$, the knife being held in peeling position by pressure of spring 33, the pressure of this spring being just sufficient to hold the cutting edge under the peel. As the contour of the fruit changes, instead of digging in, the carrier member $d$ is rotated against the pressure of this spring 33 so as at all times to maintain its correct peeling position. Immediately after the showing of Fig. 12, the upper carrying element $d$ will rotate as shown by the arrow, thus removing the peel almost up to the mandrel. This action takes place because during the cutting operation the part $d$ has turned on its pivot from the position of Fig. 10 to that of Fig. 12 and has thereby increased the tension of the coil spring $c$ Fig. 4 and the spring in assuming its normal position will quickly swing the knife as mentioned and finish the last act of peeling up next to the spindle. By correctly locating the cutting edge relative to the spacing element *b*, a peel of just the necessary thickness may be removed. When once started under the peel, the tendency of the cutting edge is to maintain itself there, following slight irregularities without breaking through as long as the correct relation is maintained between this spring pressure and the spacing element. It will also be noticed that the cutting edge is acting immediately preceding the point of contact with the spacing element.

It is obvious that various departures may be made from the showings of the drawings and the foregoing description without departing from the true spirit of the invention. Various other holding devices may be employed for passing the fruit through the machine and various arrangements of the peeling elements made to accommodate peeling in other directions than axially, all within the true meaning of my invention, and I claim:

1. In a fruit peeling machine a fruit carrying mandrel, a forked extension thereon, a device for centering the fruit relative to said mandrel and means for removing the said centering device out of the line of travel of said mandrel, said mandrel mounted for reciprocation in a substantially vertical plane, a stop positioned below the centering device and in substantially the same vertical plane as the axis of the mandrel, a pair of carrier arms having a pivotal mounting adjacent one end and positioned to extend longitudinally of the axis of the mandrel, means normally urging said arms into yielding engagement with said stop, and a peeling means carried adjacent the free ends of said arms and positioned between said stop and centering device to operatively engage the fruit on the mandrel on its downward movement.

2. In a peeling apparatus for fruit or the like peeling means arranged along the path of travel of the fruit, reciprocating means for engaging the fruit and moving it into contact with said peeling means, centering means for placing each fruit into alignment with said engaging means and holding it until said engaging means has control of said fruit, means for then moving said centering means away from said centering position to permit the fruit to be presented to said peeling means.

3. In a fruit peeling machine a fruit carrying mandrel, a forked extension thereon, a device for centering fruit relative to the mandrel and means for removing the said centering device out of the line of travel of said mandrel, said mandrel mounted for reciprocation in a substantially vertical plane, stops positioned below the centering device and in substantially the same vertical plane as the axis of the mandrel, a plurality of carrier arms having pivotal mounting adjacent one end and positioned to extend longitudinally of the axis of the mandrel, means normally urging said arms into yielding engagement with said stops, a plurality of pairs of peeling members carried adjacent the free ends of said arms and spaced axially and radially relative to said mandrel and adapted to engage the fruit on the mandrel in its downward movement.

In testimony whereof, I have hereunto affixed my signature.

MARY J. CASEY.